US012180035B2

(12) United States Patent
Derwinski et al.

(10) Patent No.: US 12,180,035 B2
(45) Date of Patent: Dec. 31, 2024

(54) ELEVATOR CAB VENTILATION

(71) Applicant: OTIS ELEVATOR COMPANY, Farmington, CT (US)

(72) Inventors: Patricia Derwinski, Farmington, CT (US); Cuauhtemoc Castro Inzunza, Florence, SC (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1177 days.

(21) Appl. No.: 16/991,413

(22) Filed: Aug. 12, 2020

(65) Prior Publication Data

US 2022/0048738 A1 Feb. 17, 2022

(51) Int. Cl.
*B66B 11/02* (2006.01)
*B66B 9/00* (2006.01)

(52) U.S. Cl.
CPC .............. *B66B 11/024* (2013.01); *B66B 9/00* (2013.01)

(58) Field of Classification Search
CPC ......... B66B 11/024; B66B 9/00; F04D 25/08; F04D 25/166; F04D 27/004; F04D 27/008
See application file for complete search history.

(56) References Cited

U.S. PATENT DOCUMENTS

2018/0009638 A1* 1/2018 Fargo .................. G02B 6/0008

FOREIGN PATENT DOCUMENTS

JP H07247060 A 9/1995
JP H08282924 A 10/1996
JP 2014015282 A 1/2014

OTHER PUBLICATIONS

Extended European Search Report for Application No. EP 21 19 0872 dated Dec. 10, 2021.

* cited by examiner

*Primary Examiner* — Jeffrey Donels
(74) *Attorney, Agent, or Firm* — Carlson, Gaskey & Olds, P.C.

(57) ABSTRACT

An illustrative example embodiment of an elevator cab ventilation device includes a fan module and a ventilation controller that is configured to control operation of the fan module based on an indication of a position of at least one door of the elevator cab. The controller is configured to control the fan module to operate in a first mode to move a first amount of air per unit time when the door is in a first open position. The controller is configured to control the fan module to operate in a second mode to move a second, larger amount of air per unit time when the door is in a second, different open position.

20 Claims, 3 Drawing Sheets

ELEVATOR CAB VENTILATION

BACKGROUND

Elevator systems typically include a cab for carrying passengers among various levels within a building. Many elevator cabs include a device for maintaining air circulation within the cab to keep passengers comfortable. Such devices typically include a fan that exchanges air between the cab and the hoistway either by blowing air into or out of the cab. Such devices are limited in the amount of air flow or the volume of air exchange that can be achieved and only exchange air between the hoistway and the cab.

Devices used for circulating air either as air exhaust or air inlet within an elevator cab typically are not configured to accomplish substantial air exchange to effectively replace the air within the cab over a short interval of time. In part, such devices are limited by the code limitations on the size of openings in the cab and the limited ability to add more openings without disrupting the characteristics or aesthetics of the cab. Additionally, cab air exchange devices air inlet or air exhaust typically are only capable of introducing hoistway air, which is not conditioned, into the cab.

SUMMARY

An illustrative example embodiment of an elevator cab ventilation device includes a fan module and a ventilation controller that is configured to control operation of the fan module based on an indication of a position of at least one door of the elevator cab. The controller is configured to control the fan module to operate in a first mode to move a first amount of air per unit time when the door is in a first open position. The controller is configured to control the fan module to operate in a second mode to move a second, larger amount of air per unit time when the door is in a second, different open position.

In an embodiment having at least one feature of the device of the previous paragraph, the at least one door has a fully closed position and a fully open position, the first open position is between the fully closed position and the fully open position, and the second open position is the fully open position.

In an embodiment having at least one feature of the device of any of the previous paragraphs, the first mode comprises at least one of operating a first number of a plurality of fans of the fan module and operating the fan module at a first fan speed; the second mode comprises at least one of operating a second number of the plurality of fans and operating the fan module at a second fan speed; the second number of the plurality of fans is larger than the first number; and the second speed is higher than the first speed.

In an embodiment having at least one feature of the device of any of the previous paragraphs, the at least one door has a fully closed position and a fully open position, an intermediate location is between the fully closed position and the fully open position, a first zone is between the fully closed position and the intermediate location, a second zone is between the intermediate location and the fully open position, the second zone includes the fully open position, the at least one door is in the first open position when the at least one door is in the first zone, and the at least one door is in the second open position when the at least one door is in the second zone.

In an embodiment having at least one feature of the device of any of the previous paragraphs, the fan module comprises a plurality of fans; the first mode includes a first number of the plurality of fans operating to move the first amount of air; and the second mode includes a second, larger number of the plurality of fans operating to move the second amount of air.

In an embodiment having at least one feature of the device of any of the previous paragraphs, the intermediate location comprises a third zone between the first zone and the second zone, the controller is configured to cause an intermediate number of the plurality of fans to operate when the at least one door is in the third zone, and the intermediate number is between the first number and the second number.

In an embodiment having at least one feature of the device of any of the previous paragraphs, the first mode comprises a first fan speed, and the second mode comprises a second, higher fan speed.

In an embodiment having at least one feature of the device of any of the previous paragraphs, the controller is configured to vary the first fan speed in a manner that decreases the fan speed as the door approaches the fully closed position.

In an embodiment having at least one feature of the device of any of the previous paragraphs, the controller is configured to vary the first fan speed in a manner that increases the fan speed as the door approaches the fully open position.

An embodiment having at least one feature of the device of any of the previous paragraphs includes a housing including the fan module in the housing and a noise damping material supported on the housing, the noise damping material being situated to dampen noise associated with at least one of operation of the fan module and the air flow caused by operation of the fan module.

An illustrative example embodiment of an elevator system includes an elevator cab including the at least one door with the elevator cab being situated to move within a hoistway to provide elevator service at a plurality of landings, and the device of any of the previous paragraphs supported on the elevator cab such that operation of the fan module draws air into the cab from one of the landings where the elevator cab is situated and vents air from the cab into the hoistway.

An illustrative example embodiment of a method of ventilating an elevator cab having at least one door that selectively closes the elevator cab includes: receiving an indication of a position of at least one door of the elevator cab, controlling a fan module to operate in a first mode to move a first amount of air per unit time through the elevator cab when the at least one door is in a first open position, and controlling the fan module to operate in a second mode to move a second, larger amount of air per unit time through the elevator cab when the at least one door is in a second, different open position.

In an embodiment having at least one feature of the method of the previous paragraph, the at least one door has a fully closed position and a fully open position, the first open position is between the fully closed position and the fully open position, and the second open position is the fully open position.

In an embodiment having at least one feature of the method of any of the previous paragraphs, the first mode comprises at least one of operating a first number of a plurality of fans of the fan module and operating the fan module at a first fan speed; the second mode comprises at least one of operating a second number of the plurality of fans and operating the fan module at a second fan speed; the second number of the plurality of fans is larger than the first number; and the second speed is higher than the first speed.

In an embodiment having at least one feature of the method of any of the previous paragraphs, the at least one door has a fully closed position and a fully open position, an intermediate location is between the fully closed position and the fully open position, a first zone is between the fully closed position and the intermediate location, a second zone is between the intermediate location and the fully open position, the second zone includes the fully open position, the at least one door is in the first open position when the at least one door is in the first zone, and the at least one door is in the second open position when the at least one door is in the second zone.

In an embodiment having at least one feature of the method of any of the previous paragraphs, the fan module comprises a plurality of fans; the first mode includes operating a first number of the plurality of fans to move the first amount of air; and the second mode includes operating a second, larger number of the plurality of fans to move the second amount of air.

In an embodiment having at least one feature of the method of any of the previous paragraphs, the intermediate location comprises a third zone between the first zone and the second zone, the method comprises operating an intermediate number of the plurality of fans when the at least one door is in the third zone, and the intermediate number is between the first number and the second number.

In an embodiment having at least one feature of the method of any of the previous paragraphs, the first mode comprises operating the fan module at a first fan speed, and the second mode comprises operating the fan module at a second, higher fan speed.

In an embodiment having at least one feature of the method of any of the previous paragraphs, the first mode comprises varying the first fan speed in a manner that decreases the fan speed as the door approaches the fully closed position.

In an embodiment having at least one feature of the method of any of the previous paragraphs, the first mode comprises varying the first fan speed in a manner that increases the fan speed as the door approaches the fully open position.

The various features and advantages of at least one disclosed example embodiment will become apparent to those skilled in the art from the following detailed description. The drawings that accompany the detailed description can be briefly described as follows.

DETAILED DESCRIPTION

Figure 1:
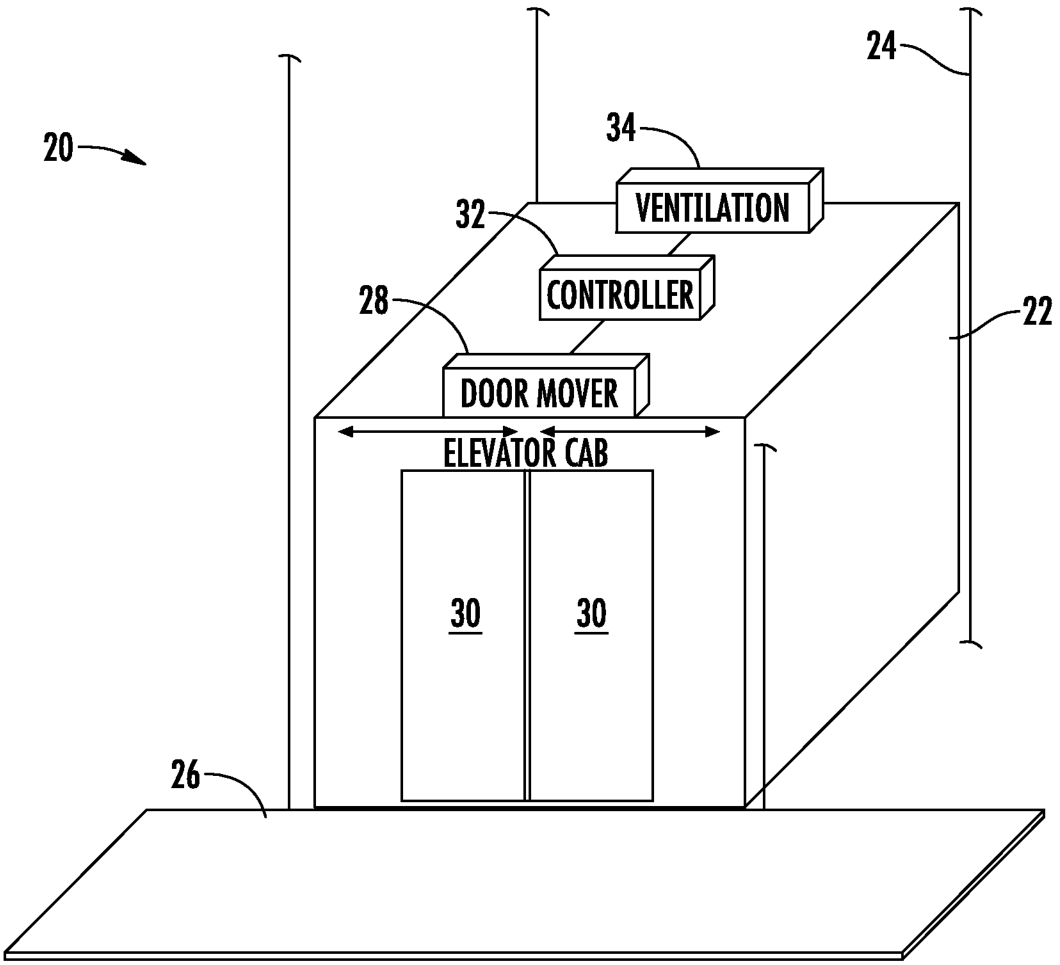
FIG. 1 schematically illustrates selected portions of an example embodiment of an elevator system including an example cab ventilation device configuration.

FIG. 1 schematically illustrates selected portions of an elevator system 20. An elevator cab 22 is situated within a hoistway 24 to provide elevator service among various landings 26 (only one of which is shown for discussion purposes). When the elevator cab 22 is situated at a landing 26 and passengers need to enter or exit the elevator cab 22, a door mover 28 controls operation of elevator doors 30 to move the doors 30 between open and closed positions. While only two doors 30 are shown for discussion purposes, some elevator cars include a set of doors on more than one side of the elevator cab. Those skilled in the art understand how elevator car doors and elevator hoistway doors interact to provide access to an elevator cab and only the car doors are shown for discussion purposes.

A ventilation controller 32 monitors the position of the doors 30. In the illustrated embodiment, the ventilation controller determines the door position based on an indication from the door mover 28 or another component of the elevator system 20 that detects door position. In some embodiments, a dedicated sensor, such as a camera, provides information to the ventilation controller 32 regarding the position of the doors 30. The ventilation controller 32 controls a ventilation device 34 to draw conditioned air from the building at the landing 26 into the elevator cab 22 and exhaust air from the elevator cab 22 into the hoistway 24. The ventilation device 34 includes a fan module that selectively operates to move air through the elevator cab 22. Although schematically shown separately in the drawing, the controller 32 and the other portions of the ventilation device 34 may be incorporated into a single unit.

The ventilation device 34 is configured to exchange the air within the elevator cab 22. The amount of air exchanged at a particular landing will depend on the amount of time available at each landing where the doors 30 open. In some embodiments, a complete air exchange may be possible over the course of an elevator run that includes stops at several landings. For example, if the ventilation device 34 can exchange a significant portion of the air in the cab 22 each time the doors 30 open at a landing, operating the fan module consistent with this description can result in the equivalent of a complete air exchange over several stops. A complete air exchange is useful to remove any possibly contaminated air including a virus or other pathogen that may be communicated among people by airborne transmission. For example, the ventilation device 34 removes air from the elevator cab 22 that may contain the COVID-19 virus, which may have been expelled from an infected individual and be present within the air in the elevator cab 22.

One way in which the ventilation device 34 differs from previous elevator cab air circulation devices is that it accomplishes an air exchange by drawing conditioned air from the landing 26 into and through the elevator cab 22 while the doors 30 are open. The ventilation device 34 draws in conditioned air from the finished building space at the landing and exhausts air from the cab 22 into the hoistway 24, which is different than simply recirculating air between the cab 22 and the hoistway 24. Additionally, the ventilation device 34 moves a significantly larger amount of air through the elevator cab 22 per unit time compared to an air circulation device. Positioning the ventilation device 34 at the upper portion or on top of the elevator cab 22 facilitates drawing cooler building air at the landing 26 into the cab 22 while venting the cab air into the hoistway 24.

Figure 2:
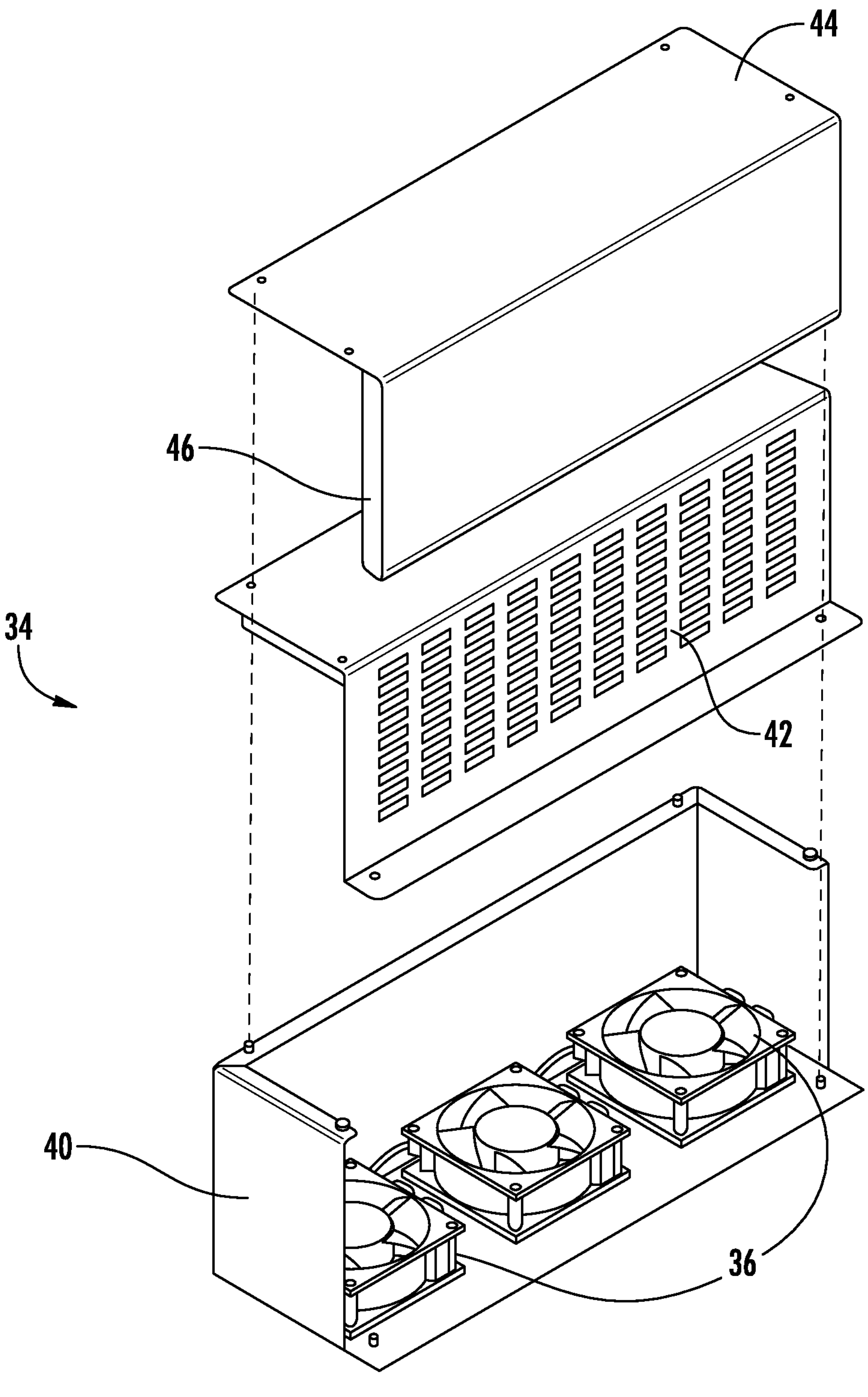
FIG. 2 is an exploded view of portions of the example cab ventilation device.

FIG. 2 illustrates an example configuration of an embodiment of a fan module of the ventilation device 34. The fan module in this embodiment includes a plurality of fans 36. The fans 36 are situated within a housing including a base 40. The fans 36 in this example are relatively small in size but collectively move a significant amount of air when all of them operate at a high or full speed. For example, one of the example fans 36 can move 0.047 cubic meters per second (100 cfm) and three can move on the order of 0.14 cubic meters per second (300 cfm). Using smaller sized fans 36 allows for including the ventilation device 34 on the top of the elevator car including the cab 22 without interfering with other elevator components or introducing overhead clearance concerns within the hoistway 24.

While three fans 36 are included in the illustrated embodiment, other embodiments include a different number of fans. Some fan modules include a single fan 36.

A louvered cover 42 is received onto the base 40. A cap 44 is received over the louvered cover 42 leaving a gap between a front of the cap 44 and the louvered portion of the cover 42 so that air drawn from the elevator cab 22 by the fans 36 may be exhausted into the hoistway 24 through the openings of the louvered cover 42 and through the gap between the cap 44 and the cover 42.

The illustrated example embodiment includes a noise reducing material 46 on the cap 44 for reducing fan module noises in the cab 22 and attenuating transmission of hoistway noise into the cab 22. The noise damping material 46 also mitigates the effect of noise inside the cab that would otherwise result from additional openings in the cab 22 to accommodate the ventilation device 34. Such openings could allow transmission of additional noise from the hoistway into the cab interior. The noise reducing material 46 in some embodiments includes contoured foam having noise-reducing properties. Other example embodiments include batting or fibrous material as the noise-reducing material 46.

Figure 3:
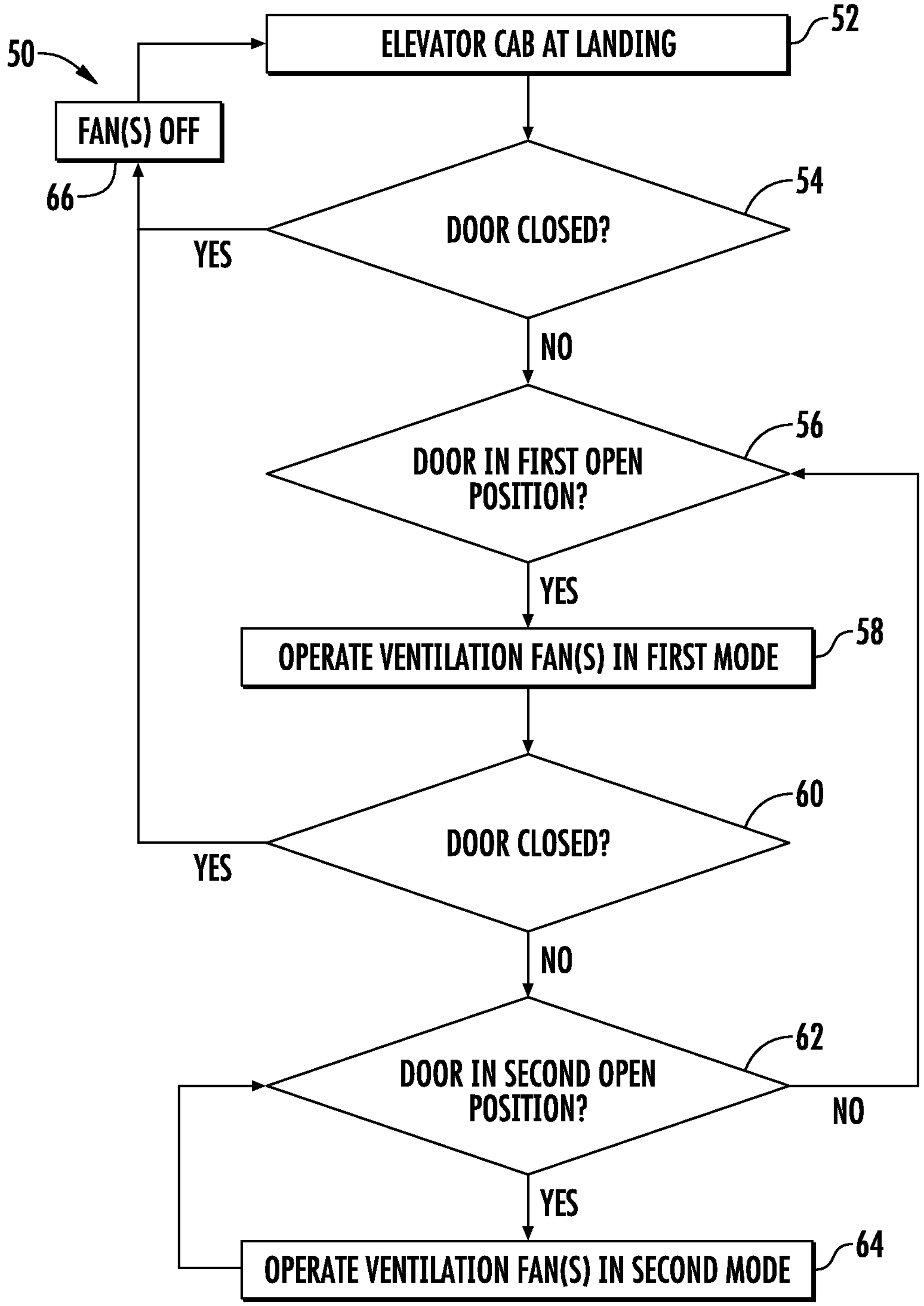
FIG. 3 is a flowchart diagram summarizing an example control strategy for operating the example cab ventilation device.

FIG. 3 includes a flowchart diagram 50 that summarizes an example control strategy for operating the ventilation device 34. At 52, the controller 32 determines or recognizes that the elevator cab 22 is at the landing 26 (or another landing). In most embodiments, the controller 32 only monitors door position and performs the other functions summarized in FIG. 3 if the elevator cab 22 is parked at a landing 26. In some embodiments, door movement may begin or end when the cab 22 is not at a complete stop and, in such embodiments, the controller 32 may operate the ventilation device 34 using the techniques of this disclosure based on such door movement.

The controller 32 monitors the door position based on an indication from the door mover 28, for example, and determines at 54 whether the doors 30 are closed. If not, the controller 32 determines at 56 whether the doors 30 are in a first open position. Whenever the doors 30 are in the first open position, the controller 32 causes at least one of the ventilation fans 36 to operate in a first mode to draw air into the elevator cab 22 from the landing 26 and exhaust air from the elevator cab 22 into the hoistway 24. The first mode of operating the ventilation fans 36 of the ventilation device 34 includes moving a first amount of air per unit time, such as cubic meters per hour (or cubic feet per minute), through the elevator cab 22.

At 60, the controller 32 determines whether to turn off the ventilation fan(s) 36 by checking at 60 whether the doors 30 are closed. If the doors 30 remain open, the controller 32 determines at 62 whether the doors 30 have transitioned from a first open position to a second open position. If the doors 30 have not reached a second open position, the fan module continues to operate in the first mode and the process continues through the steps 56-62.

In the event that the doors 30 reach the second open position, the controller 32 causes the fan module to operate in a second mode at 64. The second mode of operation includes moving a second, larger amount of air per unit time through the elevator cab 22 compared to the lesser amount of the first mode of operation. The controller 32 continues to monitor the door position at 62 and, when the doors 30 remain in the second open position, the fan module continues to operate in the second mode at 64, moving the second amount of air per unit of time through the cab 22.

The different flow rates or amounts of air per unit time of the first and second modes can be realized in several ways. In embodiments that include a plurality of fans 36 in the fan module, fewer fans 36 operate in the first mode compared to the number that operate in the second mode. In some example embodiments, the first mode of operation includes operating less than all of the ventilation fans 36. For example, only one of the ventilation fans 36 could operate during the first mode of operation. The second mode in such embodiments includes operating more of the ventilation fans 36. For example, all of the ventilation fans 36 operate in the second mode.

In some embodiments, the ventilation fans 36 have variable or different speeds of operation. Higher speeds are associated with more airflow. The first mode in some such embodiments includes operating one or more of the fans 36 at a first speed. The second mode of operation includes operating one or all of the ventilation fans 36 at a second, higher speed.

Some embodiments include a combination of a different number of fans and a different fan speed in the first and second mode, respectively.

After an appropriate dwell or door open time, the doors 30 will be begin to close in preparation for the elevator cab 22 to depart from the landing 26. The controller 32 determines at 62 that the doors 30 are no longer in the second position, determines at 56 that the doors 30 are in the first open position as they approach the closed position, operates the fan module in the first mode while the doors 30 are in the first open position, and monitors the door position while the doors 30 continue to close. Eventually the doors 30 close and when the controller 32 determines at 60 that the doors 30 have closed, the fans are turned off at 66.

In an example embodiment, the first open position includes a plurality of door positions between a fully closed position and a fully open position. In other words, whenever the doors 30 are open without reaching a fully open position, the doors are considered to be in the first open position. The second open position in such an embodiment is the fully open position of the elevator doors 30.

Moving more air when the elevator doors 30 are fully open compared to when the doors are not fully open allows for achieving a desired amount of air exchange within the elevator cab 22 without introducing air pressure differentials that could interfere with smooth door movement near the closed position. Additionally, moving less air through the elevator cab 22 when the doors 30 have not yet reached a fully open position avoids a wind noise effect that otherwise could result from forcing a larger amount of air through a smaller gap between the elevator doors 30. Additionally, passengers are less likely to notice any airflow noise as they walk into or out of the elevator cab 22 while the doors 30 are fully open.

In some embodiments, a first zone of elevator door positions is situated between the fully closed position of the doors 30 and an intermediate location along the travel path of the doors 30. The intermediate location may be at any selected position between the fully closed position of the doors 30 and the fully open position. A second zone is situated between the intermediate location and the fully open position. The second zone includes the fully open position. In such embodiments, the first open position corresponds to any door position within the first zone and the second open position corresponds to any door position within the second zone.

Such embodiments allow for utilizing the second mode of operation and a higher rate of airflow when the doors 30 are near the fully open position and before they have reached the fully open position. The intermediate location at which the controller 32 transitions between the first mode of operation and the second mode of operation may be at a mid-point of the door travel between the fully open and fully closed positions or may be relatively closer to the fully open position than the fully closed position.

In some embodiments, the controller 32 is configured to cause a first number of the ventilation fans 36 to operate in the first mode while the doors 30 are in a position in the first zone. The controller 32 causes a selected number of the ventilation fans 36 to operate in the second mode when the doors 30 are in a second position within the second zone.

Some embodiments include a third zone between the first zone and the second zone. When the elevator doors 30 are in the third zone, the controller 32 causes an intermediate number of the fans 36 to operate when the doors 30 are in such a third zone. For example, the embodiment shown in FIG. 2 could be controlled to operate one of the ventilation fans 36 in the first mode while the doors 30 are respectively in the first zone, two of the ventilation fans 36 while the doors 30 are in the third zone, and all three of the ventilation fans 36 whenever the doors 30 are in the second zone.

In some examples, the controller 32 varies the fan speed of at least the first mode of operation depending on how close the doors 30 are to the closed position. For example, the controller 32 decreases the fan speed as the doors 30 move closer to the fully closed position. In some such embodiments, the controller 32 also controls the ventilation fans 36 to increase the fan speed in the first mode of operation as the doors 30 move further away from the fully closed position while approaching the second or fully open position.

Since the ventilation device 34 is intended to move a higher volume of air per unit time through the elevator cab 22 by drawing in conditioned air from the landing 26, the ventilation fans 36 operate in the first or second mode when the doors 30 are open and the elevator cab is situated at a landing 26. Whenever the doors 30 are closed, the rapid air exchange function of the ventilation device 34 is turned off. In some embodiments, at least one of the fans 36 operates for air circulation within the elevator cab 22 when all doors of the elevator cab 22 are closed. In such embodiments, the fan module is not turned completely off even though the rapid air exchange function to draw in conditioned air from a landing while the doors 30 are open is off.

With a ventilation device 34 like that of the disclosed example embodiments, it is possible to accomplish a rapid exchange of at least a significant portion of the volume of air within the elevator cab 22. A desired amount of air exchange can be accomplished in the amount of time that the doors 30 are open at a landing to allow passengers to enter and exit the cab 22. Since the building air being drawn into the elevator cab 22 has been conditioned and filtered, clean air fills the elevator cab 22 while air that may have been contaminated by an airborne pathogen, such as the corona virus known as COVID-19 is removed.

The disclosed example embodiments provide an efficient air exchange technique for elevator cabs that does not interfere with desired, smooth operation of the elevator doors.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator cab ventilation device, comprising:
a fan module; and
a ventilation controller that is configured to
receive an indication of a position of at least one door of the elevator cab,
control the fan module to operate in a first mode to move a first amount of air per unit time when the at least one door is in a first open position, and
control the fan module to operate in a second mode to move a second, larger amount of air per unit time when the at least one door is in a second, different open position.

2. The device of claim 1, wherein
the at least one door has a fully closed position and a fully open position,
the first open position is between the fully closed position and the fully open position, and
the second open position is the fully open position.

3. The device of claim 2, wherein
the first mode comprises at least one of
operating a first number of a plurality of fans of the fan module
and
operating the fan module at a first fan speed;
the second mode comprises at least one of
operating a second number of the plurality of fans
and
operating the fan module at a second fan speed;
the second number of the plurality of fans is larger than the first number; and
the second speed is higher than the first speed.

4. The device of claim 1, wherein
the at least one door has a fully closed position and a fully open position,
an intermediate location is between the fully closed position and the fully open position,
a first zone is between the fully closed position and the intermediate location,
a second zone is between the intermediate location and the fully open position,
the second zone includes the fully open position,
the at least one door is in the first open position when the at least one door is in the first zone, and
the at least one door is in the second open position when the at least one door is in the second zone.

5. The device of claim 4, wherein
the fan module comprises a plurality of fans;
the first mode includes a first number of the plurality of fans operating to move the first amount of air; and
the second mode includes a second, larger number of the plurality of fans operating to move the second amount of air.

6. The device of claim 5, wherein
the intermediate location comprises a third zone between the first zone and the second zone,
the controller is configured to cause an intermediate number of the plurality of fans to operate when the at least one door is in the third zone, and
the intermediate number is between the first number and the second number.

7. The device of claim 4, wherein
the first mode comprises a first fan speed, and
the second mode comprises a second, higher fan speed.

8. The device of claim 7, wherein the controller is configured to vary the first fan speed in a manner that decreases the fan speed as the door approaches the fully closed position.

9. The device of claim 7, wherein the controller is configured to vary the first fan speed in a manner that increases the fan speed as the door approaches the fully open position.

10. The device of claim 1, comprising
a housing including the fan module in the housing;
a noise damping material supported on the housing, the noise damping material being situated to dampen noise associated with at least one of operation of the fan module and the air flow caused by operation of the fan module.

11. An elevator system, comprising:
an elevator cab including the at least one door, the elevator cab being situated to move within a hoistway to provide elevator service at a plurality of landings; and
the device of claim 1 supported on the elevator cab such that operation of the fan module draws air into the cab from one of the landings where the elevator cab is situated and vents air from the cab into the hoistway.

12. A method of ventilating an elevator cab including at least one door that selectively closes the elevator cab, the method comprising:
receiving an indication of a position of at least one door of the elevator cab,
controlling a fan module to operate in a first mode to move a first amount of air per unit time through the elevator cab when the at least one door is in a first open position, and
controlling the fan module to operate in a second mode to move a second, larger amount of air per unit time through the elevator cab when the at least one door is in a second, different open position.

13. The method of claim 12, wherein
the at least one door has a fully closed position and a fully open position,
the first open position is between the fully closed position and the fully open position, and
the second open position is the fully open position.

14. The method of claim 13, wherein
the first mode comprises at least one of
operating a first number of a plurality of fans of the fan module
and
operating the fan module at a first fan speed;
the second mode comprises at least one of
operating a second number of the plurality of fans
and
operating the fan module at a second fan speed;
the second number of the plurality of fans is larger than the first number; and
the second speed is higher than the first speed.

15. The method of claim 12, wherein
the at least one door has a fully closed position and a fully open position,
an intermediate location is between the fully closed position and the fully open position,
a first zone is between the fully closed position and the intermediate location,
a second zone is between the intermediate location and the fully open position,
the second zone includes the fully open position,
the at least one door is in the first open position when the at least one door is in the first zone, and
the at least one door is in the second open position when the at least one door is in the second zone.

16. The method of claim 15, wherein
the fan module comprises a plurality of fans;
the first mode includes operating a first number of the plurality of fans to move the first amount of air; and
the second mode includes operating a second, larger number of the plurality of fans to move the second amount of air.

17. The method of claim 15, wherein
the intermediate location comprises a third zone between the first zone and the second zone,
the method comprises operating an intermediate number of the plurality of fans when the at least one door is in the third zone, and
the intermediate number is between the first number and the second number.

18. The method of claim 15, wherein
the first mode comprises operating the fan module at a first fan speed, and
the second mode comprises operating the fan module at a second, higher fan speed.

19. The method of claim 18, wherein the first mode comprises varying the first fan speed in a manner that decreases the fan speed as the door approaches the fully closed position.

20. The method of claim 18, wherein the first mode comprises varying the first fan speed in a manner that increases the fan speed as the door approaches the fully open position.

* * * * *